Sept. 18, 1945.   C. H. LECHTHALER   2,384,932
METHOD AND APPARATUS FOR THE CONVERSION OF HYDROCARBONS
Filed Oct. 8, 1943
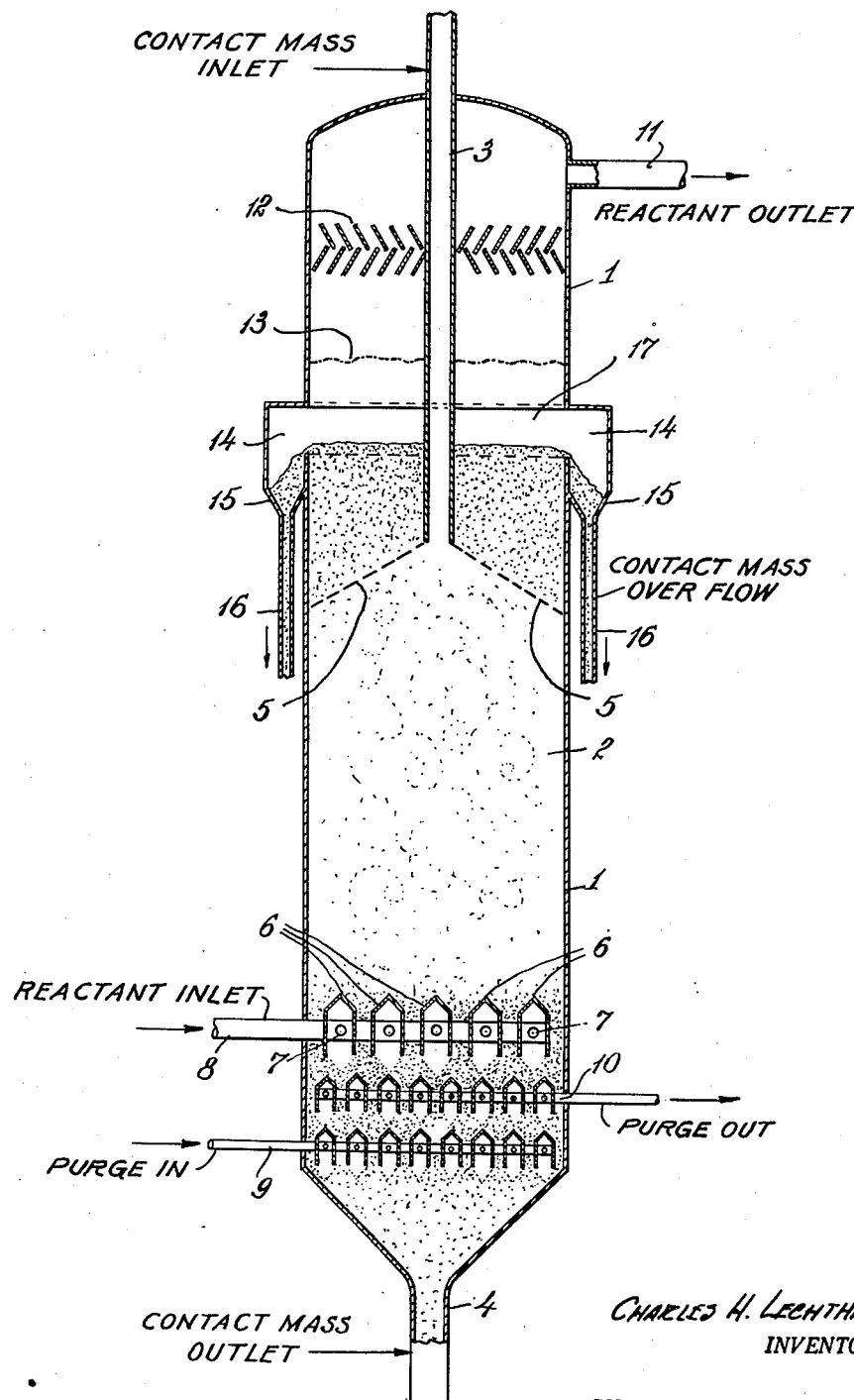

Patented Sept. 18, 1945

2,384,932

UNITED STATES PATENT OFFICE 2,384,932

METHOD AND APPARATUS FOR THE CONVERSION OF HYDROCARBONS

Charles H. Lechthaler, Woodbury, N. J., assignor to Socony-Vacuum Oil Company, Incorporated, a corporation of New York Application October 8, 1943, Serial No. 505,428

4 Claims. (Cl. 196—52)

This invention has to do with methods for the conversion of hydrocarbons in the presence of a particle form solid contact mass material. Exemplary of such conversion is the cracking of a petroleum gas oil by passing it in vapor form at a temperature usually in excess of 850° F. in contact with a particle form solid catalyst of clay type whereby around 40% by volume of the charge is converted to gasoline, a small amount to permanently gaseous hydrocarbons, a small amount to coke remaining upon the catalyst and the remainder is an essentially unchanged material much like the charge stock. Other operations of the same general kind which may be conducted are desulphurization, reforming, hydrogenation, dehydrogenation and similar reactions of hydrocarbons. More recently in this art there have been developed methods whereby the contact mass is passed cyclically through two zones, in the first of which a reaction of hydrocarbons is continuously conducted and in the second of which a combustion regeneration of the contact mass material by burning off the coke deposited upon it during reaction is conducted. In one form of operation after this pattern, the contact mass is utilized in the form of pellets of appreciable size or of granules, ranging from granules of 30 to 60 mesh upward to pellets of an average diameter of 4 mm. and even in some cases to larger particles. In such processes the contact mass material is handled in a flow path of its own, which flow path is substantially independent, although it may be somewhat affected by the flow path of the reactant vapors which are brought into contact with it. In a usual form of this process, the contact mass material is passed downwardly through both the reactor and the regenerator as an essentially compact moving column, through which reactant vapors or combustion supporting gas, as the case may be, are passed upwardly. This invention has particularly to do with operations of this latter specific kind and is concerned with such operations wherein the rate of flow of reactant is sufficiently great to partially disrupt the downwardly moving bed of contact mass material and to give it a rather turbulent form of downward flow. Such operations find a place in that they are capable of utilizing space velocities greater than those normally capable of being utilized by countercurrent flow under compact bed conditions.

In such operations two serious defects occur due to the high rate of reactant flow. The first is a continual carrying of fine particles of contact mass material upwardly through the descending bed of contact mass material eventually giving a volume at the top of the bed wherein a heavy concentration of such fine material occurs and from which, after a time, it is extremely difficult to prevent the carry over of fines into the vapor stream leaving the reactor. A second disadvantage is that material so carried to the top of the reactor bed remains there exposed to reactant vapors and hence acquires a heavier coating of coke than does the average contact mass particle and frequently such material may be agglomerated and pass into the descending contact mass material stream or otherwise descend thereinto causing erratic operation of regeneration. In other cases it may very seriously disrupt operation in other ways. The objections above outlined persist whether the contact mass material is showered into the top of the reactor zone or whether it is introduced into the reactor zone at a level some distance below the top in order to provide a disengaging space. The second disadvantage is most marked in this latter type of operation, that is, in one where the level of contact mass introduction is somewhat below the top of the reactor space. In this operation at the high rates of reactant flow used in turbulent operation, the contact mass bed will fluff up and build up to a distance, depending upon rate of flow, which can frequently be several feet above the point of contact mass inlet. Contact mass particles that get into this region, large or small, remain there for very considerable periods of time and an even greater collection of fines and greater difficulties with over-coking occur in connection therewith.

This invention has for its object the provision of a method of operating a hydrocarbon conversion in the presence of a particle form solid contact mass material at high rates of flow which is capable of avoiding many of the difficulties outlined above.

The invention may be readily understood from the drawing attached hereto, the single figure of which shows in diagram form an apparatus and method of processing as herein outlined.

In this drawing, 1 designates the shell of a reactor housing a descending column of particle form solid contact mass material designated by 2. The contact mass material is introduced into the reactor by pipe 3 which terminates at a level substantially below the top of the reactor and it is removed therefrom by pipe 4 at the bottom of the reactor. The rate of flow of contact mass material will be so controlled that in the absence of high rates of reactant flow, the reactor will be filled with contact mass material to a level shown by the dotted lines 5. Near the bottom of the reactor, but spaced vertically above it, there is provided a series of distributor troughs 6, each communicating by orifices 7 to a reactant inlet pipe 8. Below this level there is a purging arrangement for the removal of reactants from departing catalyst composed of a distributor trough and inlet pipe assembly 9 and a collector trough and exit pipe assembly 10, each of which assemblies is generally similar in construction to the reactant inlet with its distributor troughs. At the upper end of the reactor there is provided a reactant outlet pipe 11 and in the usual circumstance there may be provided in the reactor somewhat below the reactant outlet pipe 11 one or more baffle structures 12 serving both to maintain the upward flow of reactants substantially equal across the cross-section of the reactor and also to knock-out from the vapors much of the contact mass material which may be entrained therein.

When operated at high rates of flow sufficient to build up a turbulent flow condition within the descending column of contact mass material it has been found that the level of the top of column of contact mass material will build up to some such level as that indicated by the wavy dotted line 13 and, as explained above, a very considerable amount of the material rising to this level will tend to remain there and disrupt the reactor operation. In order to avoid this, there is provided the following arrangement.

At 14 there has been provided an opening or openings in the shell bounding the reactor space. This may be either an opening extending around the entire periphery of the reactor or it may merely be a series of openings at the same level distributed around the reactor. In any event, these openings 14 communicate with a series of hoppers 15 which, in turn, communicate with a series of draw-off pipes 16 which draw-off pipes may be manifolded in known manner and led to any disposal, preferably into the same disposal stream as is pipe 4.

In this apparatus then the rising body of contact mass material may build up only to the level indicated by 17, at which time contact mass will commence to over-flow through openings 14 into hoppers 15 and be conducted away through pipe 16. Since the over-burden at the top of the column is continuously removed, the tendency for fines to concentrate at this level is very greatly reduced, the portion of the contact mass flowing upward being of a general makeup similar to the main stream of contact mass material. Similarly no material is allowed to remain for greatly extended periods in the path of reactant flow to be over-coked.

Due to variations between commercial operations in density of reactants arising from kind of reactant, temperature, and pressure; real and apparent density of the contact mass material; size of contact mass material; and other variables, it is not possible to numerically evaluate the rates of flow which are herein spoken of as giving the turbulent conditions. However, these rates of flow may be distinguished quite readily by the fact that as soon as the zone of turbulent operation is entered the upper surface of the column of contact mass material commences to rise above its normal level, as indicated by dotted lines 5. There is, of course, an upper limit imposed upon all operations of this type, namely, the velocity of the reactants must be less than the terminal velocity sufficient to carry particles of normal operating size in the departing gas stream.

I claim:

1. A method for the conversion of hydrocarbons in the presence of a particle form solid contact mass material comprising flowing contact mass downwardly under the influence of gravity through a confined passage and withdrawing it from the bottom thereof at a rate sufficient to keep said passage partially filled with a column of contact mass material, introducing fluid reactant into said column at a point adjacent to but spaced above its bottom end, flowing the reactant upwardly through said column at a rate sufficient to maintain said column in a turbulent condition but insufficient to carry away normal sized particles from said column, withdrawing reactant from said passage at a point above the top of said column, withdrawing overflow of contact mass material from the top of said column to a space without said passage, and removing said withdrawn material from said space.

2. A method for the conversion of hydrocarbons in the presence of a particle form solid contact mass material comprising flowing contact mass downwardly under the influence of gravity through a confined passage to which it is introduced at a point below the top of said passage and withdrawing it from the bottom thereof at a rate sufficient to keep said passage filled up to the point of introduction with a column of contact mass material, introducing fluid reactant into said column at a point adjacent to but spaced above its bottom end, flowing the reactant upwardly through said column at a rate sufficient to maintain said column in a turbulent condition but insufficient to carry away normal sized particles from said column, withdrawing reactant from said passage at a point above the top of said column, withdrawing overflow of contact mass material from a point above the point of contact mass feed to a space without said passage, and removing said withdrawn material from said space.

3. Apparatus for the conversion of hydrocarbons in the presence of a particle form solid contact mass material comprising a shell defining an enclosed vertically columnar reaction chamber, means to introduce contact mass to said chamber at a point toward but spaced below the top thereof and means to remove contact mass from the bottom thereof while maintaining the chamber partially filled with contact mass material, reactant inlet means adjacent to but spaced away from the bottom of said chamber, reactant outlet means near the top of said chamber, and auxiliary contact mass removal means located near the top of said chamber but spaced away from and below said reactant outlet and spaced away from and above the point of discharge of said contact mass inlet means.

4. Apparatus for the conversion of hydrocarbons in the presence of a particle form solid contact mass material comprising a shell defining an enclosed, vertically columnar reaction chamber, means to introduce contact mass material to the top thereof, means to remove contact mass material from the bottom thereof while maintaining the chamber partially filled with contact mass material, reactant inlet means adjacent to but spaced from the bottom of said chamber, reactant outlet means near the top of said chamber, auxiliary contact mass material removal means located near the top of said chamber but spaced from and below said reactant outlet, said auxiliary removal means being constructed and arranged to remove sufficient of said contact mass material to prevent build up of said contact mass material within said reaction chamber substantially above the upper level thereof and at least one baffling member between said auxiliary contact mass material removal means and said reactant outlet means.

CHARLES H. LECHTHALER.